United States Patent [19]

Schweiso

[11] 4,049,151

[45] Sept. 20, 1977

[54] METAL EXPANSION PLUG

[75] Inventor: Robert J. Schweiso, Los Altos, Calif.

[73] Assignee: Raychem Corporation, Menlo Park, Calif.

[21] Appl. No.: 320,930

[22] Filed: Jan. 4, 1973

[51] Int. Cl.² .................. B65D 51/12; B65D 55/00
[52] U.S. Cl. ........................................ 220/201; 220/305
[58] Field of Search ............... 220/24 A, 305, 301, 220/306, 307; 29/447, DIG. 35

[56] References Cited

U.S. PATENT DOCUMENTS

| 1,101,084 | 6/1914  | McCarty | 29/447    |
| 1,363,153 | 12/1920 | Murray  | 220/24 A  |
| 2,575,213 | 11/1951 | Fruth   | 29/447    |
| 2,687,228 | 8/1954  | Knocke  | 220/24 A  |

FOREIGN PATENT DOCUMENTS

| 423,518   | 2/1935 | United Kingdom | 29/447  |
| 1,076,494 | 7/1967 | United Kingdom | 220/201 |

OTHER PUBLICATIONS

"Cold Treating Practice with Deepfreeze", published by Motor Products Corporation, 1946, 4 pages.

Primary Examiner—William Price
Assistant Examiner—Allan N. Shoap
Attorney, Agent, or Firm—Lyon & Lyon

[57] ABSTRACT

A device for plugging or sealing apertures comprising a heat recoverable dished disc which has the capability to increase its radial dimension upon being heated to a temperature above the transition temperature of the metal. Sealing is accomplished by selecting a heat recoverable dished disc having a radial dimension smaller than that of the aperture to be sealed, but which is capable of increasing its radial dimension to a magnitude greater than that of the aperture. The disc is inserted into the aperture and exposed to a temperature higher than its transition temperature whereupon the disc attempts to return to its original substantially planar configuration thereby increasing in radial dimension and sealing the aperture.

7 Claims, 6 Drawing Figures

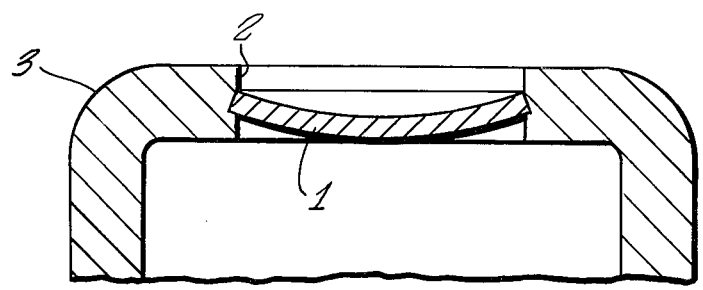
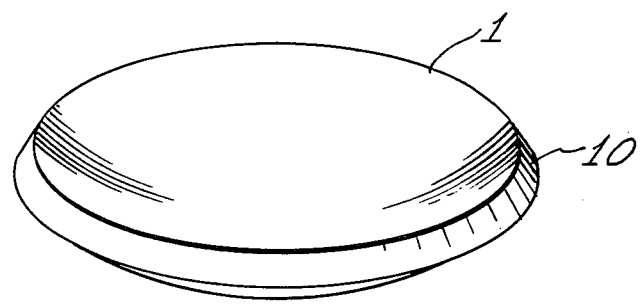
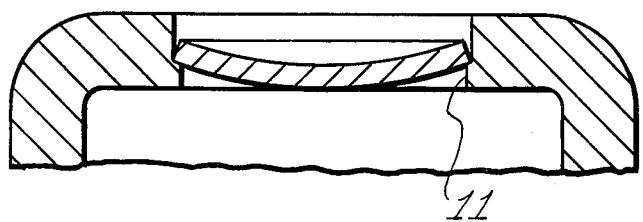
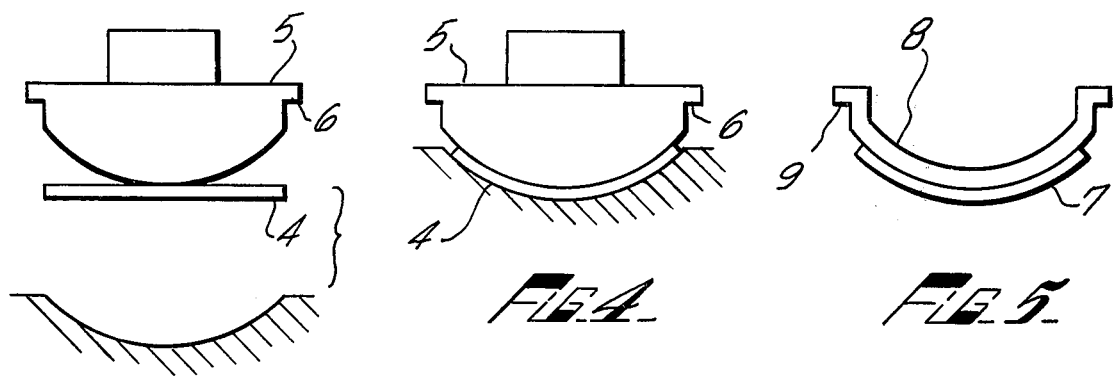

METAL EXPANSION PLUG

BACKGROUND OF THE INVENTION

Many types of closure means are known for sealing or plugging apertures in metal and other structures, e.g., tanks, drums, etc. The most commonly used are threaded screw-type means and force-fitting plugs. The efficiency of such closure means is directly related to the precision and tolerances used in sizing the mating surfaces. When the requirements on such devices are highly demanding, e.g., when it is desired to seal against the leakage of pressurized gaseous materials, extreme care must be taken in preparing the closure means and, often, in preparing the aperture itself as by threading or dressing the seating surfaces which will be contacted by a force-fitting plug.

Among the several types of force-fitting closure means presently in use are included so-called "expansion plugs." Expansion plugs are typically cup-shaped or disc-shaped. In either case the plug is seated by ramming it into place with a rod or similar means. In the case of the cup-type expansion plug, a plug which is slightly larger in radial dimension than the aperture is selected and such sealing as is obtained results from the spring effect of the resilient wall of the cup on the walls of the aperture. Substantial care must be exercised in ramming such plugs, because it is essential that the line of direction of the ramming force not be skew to the axis of the cup or else the plug will twist during seating. Such twisting would, of course, preclude achievement of an effective seal. In the case of the disc-type expansion plug, a deformed disc which has one surface which is generally convex and another surface which is generally concave, and which may be of a generally dished configuration, is inserted into an aperture having a radial dimension slightly larger than the radial dimension of the disc. Upon ramming, the disc flexes and such sealing as is obtained results from the radial forces which the flexed disc is capable of exerting. The recommended manner of setting such discs is to so size them such that when they are rammed they are capable of turning inside out, i.e., the concave surface becomes convex and visa versa, and then spring back to an almost flat position. In order to obtain such action, it is recognized that close tolerances must be achieved. In this regard, it is recommended that the angle between the cylindrical sides and the bottom of the counterbore in the aperture should be 95° to 97°. Such discs are subject to many difficulties, including the need to exercise very substantial care in preparing the seating surfaces in the aperture as by counterboring, the tendency of such plugs to self-release under high pressures, particularly when the plug is installed such that a concave surface faces the interior of the chamber to be sealed. Lastly, both types of expansion plugs are subject to the deficiency that a ramming force which has a jarring effect on the chamber to be sealed must be used. Such forces are often highly undesirable, since they cause vibrations which may loosen other fittings, disturb the contents of the chamber, or, in extreme cases, create risk of explosion.

SUMMARY OF THE INVENTION

The present invention relates to heat recoverable plugs which can be rapidly and reliably installed in apertures to be sealed, together with a method of using the same. The heat recoverable plug is manufactured from a metal having the capability of changing shape when it passes from the martensitic phase into the austenitic phase. Preferably, the plug is prepared by deforming a thin disc of metal having the capability of having heat recoverability imparted to it into a dish shape, i.e., such that one surface is convex and the other concave. When exposed to temperatures above the transition temperature, i.e., that temperature at which there is transition from martensitic to austenitic phase, the disc attempts to return to its original planar configuration and, as it tries to flatten out, it expands in diameter. The heat recoverable plug is so selected that the radial dimension of the aperture is less than the radial dimension of the disc in its flat configuration. Thus, the walls of the aperture prevent full recovery to flatness and tremendous forces are developed causing circumferential penetration of the disc edge into the sidewall of the aperture. This provides positive, metal-to-metal engagement and achieves a very effective seal.

While the preferred embodiment of the present invention contemplates the use of a planar disc which has been deformed into a dish shape, it is to be understood that many other configurations of plug may be used, depending on the configuration of the aperture to be sealed and the special effects, if any, which may be desired. While the plug in the usual case will be solid, if may, if desired, be perforated or otherwise irregular in configuration.

BRIEF DESCRIPTION OF THE DRAWINGS

FIG. 1 is a cross-sectional view of a plug of the present invention after installation in an aperture.

FIG. 2 is a perspective view of a heat-recoverable plug after deformation, but before installation.

FIG. 3 shows a disc and forming dies prior to deformation.

FIG. 4 shows the disc and dies of FIG. 3 after deformation.

FIG. 5 shows a deformed disc having another type of positioning device removably attached thereto.

FIG. 6 is a cross-sectional view of a plug of the present invention after installation on a shelf in an aperture.

DESCRIPTION OF THE INVENTION

The foregoing summary is only a brief description of the present invention. In order to understand the invention more completely, certain properties of the metals from which the plugs of the present invention may be made must be discussed in more detail. It is to be understood that the following discussion, and all of the theories and principles expressed herein, are set forth to further understanding of the invention, but, while they are the best information presently available to the inventor, are not to be considered in any manner restrictive of the invention nor does the operability or utility of the invention depend on the inventor's belief as to its theory of operation.

As used herein, the term "heat recoverable" means that a material has been deformed from an original, heat-stable configuration to a different configuration in which it will remain until raised above a certain temperature upon which it will return to its heat-stable configuration. The deformation used to place the material in the heat-unstable configuration will be referred to herein as "thermally recoverable plastic deformation." A material which may be so deformed and recovered is referred to herein as a "material capable of having the property of heat recoverability imparted thereto." The temperature at which a change in configuration occurs upon heating is referred to herein as the "transition temperature." It should be understood that the transition temperature may be a temperature range, and that a hysteresis usually occurs which causes the precise temperature at which a transition takes place to depend on whether the temperature is rising or falling. Further, the transition temperature is a function of the stress applied to the material, the temperature rising with increasing stress.

Examples of metallic materials which are capable of having the property of heat recoverability imparted thereto are the alloys disclosed in U.S. Pat. Nos. 3,012,882, 3,174,851, and 3,567,523 and Belgium Pat. No. 703,649, as well as United States Patent Applications Ser. Nos. 51,809 and 52,112, both filed July 2, 1970, and assigned to the assignee of the present application, the disclosures of which are incorporated by reference herein to illuminate the background of the present invention. However, it is to be understood that the present invention is not limited to the use of any particular type of heat-recoverable metal, but rather comprehends the use of any heat-recoverable metal, whether now known or discovered in the future.

Generally speaking, metals having transition temperature within the range of + 135° C to − 196° C are satisfactory for use in this invention. The preferred embodiment of the present invention comprises preparation of a planar disc from a nickel titanium alloy containing 47.1% nickel, 49.4% titanium, and 3.5% iron. This composition results in a material with a transition temperature of approximately −125° C. The disc is reduced to a temperature below its transition temperature by immersing it in Liquid Nitrogen which exhibits a stable temperature of − 196° C. While held at this reduced temperature, the disc is subjected to sufficient force, e.g., in a press, to cause thermably recoverable plastic deformation to take place whereby the disc is placed in a heat-unstable dished configuration. The deformed disc is then held at a temperature below its transition temperature, e.g., by continued immersion in liquid nitrogen, until it is ready for use.

If the specific disc having a diameter of 1.02 inches and a thickness of 0.04 inches is to be used to seal a hole having an aperture of 1.00 inches, it is subjected to sufficient deformation to cause its radial dimension to be reduced to less than a diameter of 1.00 inches, e.g., to 0.98 inches. When it is desired to use the heat-unstable plug, it is removed from its low temperature environment and placed in the aperture to be plugged. As the plug warms to room temperature, the material passes through its transition temperature and undergoes transition from the martensitic to the austenitic phase. As this occurs, the disc attempts to revert to its original flat configuration and expands in diameter. As shown in FIG. 1, after installation and recovery, the plug 1 retains a dished configuration because the walls of aperture 2 in plate 3 have a diameter less than the original flat diameter of the plug. Tremendous forces are generated during recovery causing penetration of the disc edge 4 into the sidewall of the aperture. This provides a highly effective seal. When subjected to a helium leak test, it has been found that such a plug permits no detectable leakage when pressurized with helium (mass spectrometer sensitivity; $1 \times 10^{-10}$ scc/sec). In addition, no hydraulic leakage occurred when the plug was held at incremental pressures up to 1,000 psi and in burst tests vented pressure at 1100 to 1200 psi. It is important to recognize that these results were achieved with no critical tolerances or surface finishes because of the great magnitude of the forces exerted by the plug during thermal recovery.

Preferably, the plug is installed such that the convex surface faces the higher pressure side of the chamber to be sealed. When installed in this manner, sealing forces will increase with the application of pressure complementing the sealing forces generated by the thermal recovery of the disc.

For purposes of clarity, plug 1 is shown in perspective in FIG. 2 as it appears prior to installation in an aperture.

FIGS. 3 and 4 illustrate one means for assuring that the axis of the plug is substantially perpendicular to the plane of the wall in which the aperture to be sealed is located. FIG. 3 illustrates a flat disc 4 to which a male forming die 5 is removably attached, e.g., by glue. The disc with attached die is reduced to below its transition temperature and forming pressure is applied to die 5 by means of female die 5a to deform disc 4 as shown in FIG. 4. Lip 6 on die 5 will then serve to locate disc 4 in the aperture to be sealed. After the dished disc 4 is inserted into the aperture and allowed to warm to above its transition temperature whereby the aperture is sealed, die 5 is removed by simply pulling with enough force to break the glue bond with the disc. Die 5 may be fabricated from plastic, metal, or other suitable material. The configuration of die 5 will vary according to the original shape of disc 4 and the configuration of the deformation which it is desired to impart.

Another embodiment of this invention is shown in FIG. 5 wherein a "hat" 8 is removably attached to disc 7 after deformation. Lip 9 on hat 8 functions to position disc 7 in the same manner as lip 6 of die 5.

Still further, as shown in FIG. 6, the wall of the aperture to be sealed may be counterbored or countersunk to provide a lip or shelf 11 on the "inner" or "bottom" portion of the wall to aid in positioning the plug of this invention. The lip or shelf 11 described above may be continuous or discontinuous. When such a shelf is employed, the male die would not require any positioning lip such as those shown in FIGS. 3—5. The outer edge 10 of the disc 1 may be provided with grooves, ridges, teeth, or other means to maximize its effectiveness upon recovery of the disc.

It will be readily apparent to those skilled in the art that the foregoing invention may be modified as to configuration of plugs, choice of heat-recoverable metal, and otherwise without departing from the concept of the present invention. in this regard, it is pointed out that the original configuration of the plug need not be that of a planar disc. However, in the typical situation where a round aperture is to be sealed, it is believed that the use of a planar disc which is deformed to a dish-shaped configuration is the most convenient and effective embodiment of this invention.

What is claimed is:

1. A heat recoverable metal plug, which has been deformed from a heat-stable configuration into a heat-unstable configuration, having a transverse dimension smaller in its heat-unstable condition than in its heat-stable condition, said plug being capable of changing its transverse dimension upon being heated to above the transition temperature at which it recovers to its heat-stable condition from its heat-unstable condition, said plug is heat unstable in its martensitic state and heat-stable in its austenitic state.

2. The plug of claim 1 wherein said plug comprises an alloy of titanium and nickel.

3. The plug of claim 1 wherein said plug has a dished configuration.

4. The plug of claim 1 wherein said plug is provided with means for locating said plug in an aperture.

5. A heat-recoverable metal plug having a generally circular dished configuration in its heat-unstable state, said plug being capable of recovering to a substantially flat configuration upon being heated to above the transition temperature at which it reverts from its heat-unstable state to its heat-stable state, and the following has been inserted thereafter - - - said plug is heat unstable in its martensitic state and heat-stable in its austenitic state.

6. The plug of claim 5 wherein said plug comprises an alloy of titanium and nickel.

7. The plug of claim 5 wherein said plug is provided with means for locating said plug in an aperture.

* * * * *